(12) United States Patent
Abe

(10) Patent No.: US 7,752,927 B2
(45) Date of Patent: Jul. 13, 2010

(54) CABLE-TYPE LOAD SENSOR

(75) Inventor: Tomiya Abe, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/357,030

(22) Filed: Jan. 21, 2009

(65) Prior Publication Data
US 2009/0183579 A1 Jul. 23, 2009

(30) Foreign Application Priority Data
Jan. 22, 2008 (JP) .............................. 2008-011407

(51) Int. Cl.
*G01L 1/20* (2006.01)
(52) U.S. Cl. ................................. 73/862.627
(58) Field of Classification Search ............. 73/862.627
See application file for complete search history.

(56) References Cited

U.S. PATENT DOCUMENTS

| | | | | |
|---|---|---|---|---|
| 3,981,181 A | * | 9/1976 | Ochiai ...................... 73/40.5 R |
| 4,883,338 A | * | 11/1989 | Abe et al. ................... 385/144 |
| 6,078,014 A | * | 6/2000 | Kashiwazaki et al. .... 200/61.43 |
| 6,107,580 A | * | 8/2000 | Hoshikawa et al. ...... 200/61.43 |
| 6,122,431 A | * | 9/2000 | Abe et al. ................... 385/145 |
| 6,316,846 B1 | * | 11/2001 | Kashiwazaki et al. ....... 307/119 |
| 7,256,347 B2 | * | 8/2007 | Gustavsson ............... 174/74 R |
| 7,513,166 B2 | * | 4/2009 | Shank et al. .................. 73/780 |
| 7,534,957 B2 | * | 5/2009 | Yamaura et al. .............. 174/36 |
| 2002/0020223 A1 | * | 2/2002 | Kume .......................... 73/763 |
| 2002/0079905 A1 | * | 6/2002 | Brown ......................... 324/543 |
| 2005/0268734 A1 | * | 12/2005 | Watkins, Jr. et al. .......... 73/866 |
| 2008/0011093 A1 | * | 1/2008 | Shank et al. .................. 73/780 |
| 2009/0133994 A1 | * | 5/2009 | Yasuda et al. ............ 200/61.43 |
| 2009/0183578 A1 | * | 7/2009 | Abe et al. .............. 73/862.627 |

FOREIGN PATENT DOCUMENTS

| | | |
|---|---|---|
| JP | 6-084602 | 3/1994 |
| JP | 8-313371 | 11/1996 |
| JP | 3354506 | 9/2002 |

* cited by examiner

*Primary Examiner*—Lisa M Caputo
*Assistant Examiner*—Freddie Kirkland, III
(74) *Attorney, Agent, or Firm*—Brundidge & Stanger, P.C.

(57) ABSTRACT

A cable-type load sensor comprises two conductors arranged in parallel; and an elastic cladding layer with which surroundings of two conductors are covered. Each of two conductors comprises at least one of a nickel chromium system alloy, an iron nickel system alloy, a copper nickel system alloy, and a nickel titanium system alloy.

4 Claims, 2 Drawing Sheets

CABLE-TYPE LOAD SENSOR

TECHNICAL FIELD

The present invention relates to a cable-type load sensor.

BACKGROUND ART

In conventional load sensors, a typical electrical sensor generally uses a method of detecting the load by using a pressure sensor, an accelerator sensor or a strain gage, or a method of detecting the load by the use of the modulated intensity of light inside an optical fiber caused by flexural loss and compression loss of the optical fiber.

In the above methods, as the electrical processing circuits and the light sensing and emitting apparatus are complex, or their detection accuracy and noise tolerance are low, there has never been a good solution for providing low-cost, downsized and high-precision sensors.

Because the distortion gauge which detects load by converting changes in sectional area and length of a resistor caused by applying the load to the resistor into change in electric resistance can accurately detect an amount of the load, it is used in various uses such as load cells.

As a typical example, a method of detecting an amount of the distortion of a rigid body in which a thin film is put on the rigid body is described in JP 06-84602 A and JP 08-313371 A.

In addition, a sensor which detects contact at an arbitrary position along a cable is proposed in JP 3354506 B.

SUMMARY OF INVENTION

Because an amount of distortion cannot be detected at an arbitrary position along the cable though the methods described in JP 06-84602 A and JP 8-313371 A or the distortion gauge can detect a partial distortion, their uses are limited.

Moreover, there is a problem that an amount of distortion (an amount of load) cannot be measured though the sensor described in JP 3354506 B can detect contact at an arbitrary position along a cable.

An object of the present invention is to provide a cable-type load sensor having an advantage in layout and being capable of sensing the load with a high degree of precision.

To achieve the above-mentioned object, a cable-type load sensor according to one aspect of the present invention comprises two conductors arranged in parallel, and an elastic cladding layer with which surroundings of two conductors are covered. And, each of the two conductors comprises at least one of a nickel chromium system alloy, an iron Ni system alloy, a copper nickel system alloy, and a nickel titanium system alloy.

Preferably, the change in an elasticity modulus characteristic of the cladding layer is $1 \times 10^6$ to $1.5 \times 10^6$ Pa in a temperature range of $-30°$ C. to $70°$ C.

Preferably, the cladding layer comprises at least one of silicone rubber and ethylene-propylene rubber.

According to the present invention, a low-cost and high-precision cable-type load sensor is obtained, which excels in layout and results in decreased mechanical deterioration.

DESCRIPTION OF EMBODIMENTS

Hereafter, one preferable embodiment of the present invention is explained in detail with reference to drawings.

Figure 1:
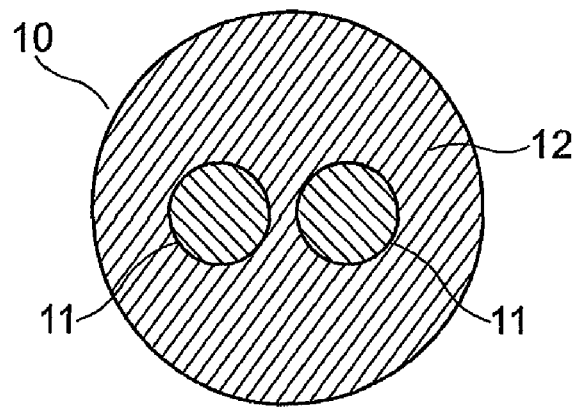
FIG. 1 is a sectional view showing a cable-type load sensor according to the present invention.
Figure 2:
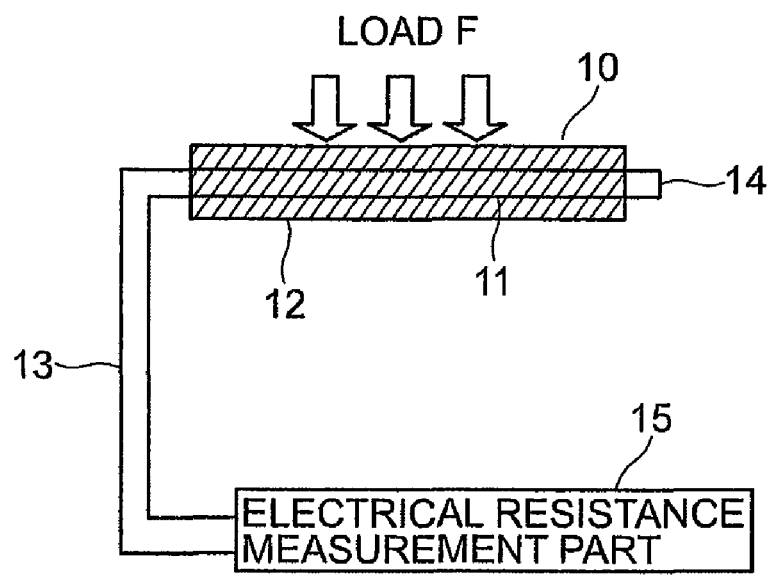
FIG. 2 is a diagrammatic illustration of a load measurement system, in which the cable-type load sensor shown in FIG. 1 is connected to an electric resistance measurement part.

FIG. 1 is a sectional view of cable-type load sensor 10 according to the present invention, and FIG. 2 is a diagrammatic illustration of a measurement system, which detects load by using cable-type load sensor 10.

As shown in FIG. 1, cable-type load sensor 10 is composed by arranging two conductors 11 in parallel, each of which comprises a wire rod made of electric resistance material, and by covering two conductors 11 with cladding layer 12, which includes insulating rubber such as silicone rubber, ethylene-propylene rubber and so on.

The load measurement system which detects the load by using this cable-type load sensor 10 is composed as shown in FIG. 2. One ends of conductors 11 and 11 are connected electrically by using metal wire 14, and the other ends are connected to electric resistance measurement part 15 through lead line 13. Metal wire 14 can be also composed by turning conductor 11.

Here, to detect slight change in electric resistance of conductor 11 with a high degree of accuracy, electric resistance measurement part 15 is composed by using a bridge circuit. Therefore, an output of electric resistance measurement part 15 is taken out as an electric power signal.

Because the length and the sectional area of conductor 11 change according to the magnitude of load when load F is applied to cable-type load sensor 10, the load can be detected by detecting this change in electric resistance measurement part 15.

Next, the principle of the present invention is explained.

Assumed that the length of the conductor is L, the sectional area is A, and the volume resistivity of the conductor is ρ. Electric resistance R of a conductor is expressed by Equation (1).

$$R = \rho L/A \tag{1}$$

The present invention applies the above relationship to a sensor.

The load can be detected as the change in the electrical resistance R of the conductor induced by the changes in the length L and the cross-section A of the conductor, both caused by the applied load.

The length L of the conductor becomes longer and its cross-section A becomes smaller due to the load applied in the direction of its side face. This means that the electrical resistance R becomes larger when the load is applied in the direction of the side face.

For example, typical strain gauges amplify the slight change in the electrical resistance of the metallic resistor by using a bridge circuit. Though such strain gauges are very high-precision device, as they have a very small sensor part, the resultant sensor apparatus become large and complex in case of detecting at arbitrary positions along the cable because it is required to layout strain gauges at those positions individually.

The inventors achieved a high-precision sensor which can detect the load at any position along the cable by using the material with high electric resistance as conductor 11.

In the present invention, cladding layer 12 which comprises insulating rubber can detect the electric resistance of conductor 11 according to the load fluctuation with a high degree of accuracy, and it is also used to prevent the resistance change by contact with an outside conductor. Further, cladding layer 12 is desirable to have the function for generating the restoring force to return to the original shape when the load to cable-type load sensor 10 was removed. Therefore, it is preferred to use rubber material which can restore after distortion.

Here, when it is assumed that cable-type load sensor 10 may be used in a wide range of operating temperature, it is preferable to use silicone rubber or ethylene-propylene rubber which has smaller change in volume elasticity modulus (hardness) under operation from low temperature to high temperature as the insulating rubber. The change in an elasticity modulus characteristic of the cladding layer is desirable to be $1\times10^6$ to $1.5\times10^6$ Pa in a temperature range of $-30°$ C. to $70°$ C.

Moreover, the material with comparatively high electric resistance that the electric resistance change is large in relation to the stress is preferable as conductor 11. Further, it is thought that a nickel chromium system alloy, an iron nickel system alloy, a copper nickel system alloy or the nickel titanium system alloy is especially suitable as the material.

When the electric resistance of conductor 11 for core material is too low, the resistance change becomes small and the error of measurement is caused. Oppositely, because it is difficult to measure the member of the high-resistance with a high degree of accuracy when the electric resistance of conductor 11 is too high, it is also not preferable for conductor 11.

It is desirable to be $10\Omega$ to $10^6$ $\Omega/m$ as the electric resistance in the present invention.

Moreover, it is desirable to use two conductors 11 as the cable structure of this sensor. One ends of the conductors 11 are connected electrically, and the resistance change of conductor 11 is measured at the other ends. Because one ends only have a simple junction structure like this, it is possible to downsize the sensor, and it is advantageous when the sensor is laid down.

Next, a more concrete embodiment is explained.

Cable-type load sensor 10 was composed as follows. Two conductors 11, which comprises the metal wire of iron chromium alloy FCHW-1 (electric resistance 11 $\Omega/m$ and made by Tokyo Resistance Wire Corp.) of 0.35 mm$\phi$ in outside diameter were arranged in parallel with the spacing of 1 mm. Next, insulating cladding layer 12 which comprises silicone rubber of A55 in hardness of rubber was covered so that the outside diameter may become 4 mm$\phi$. It only has to be length which can be laid down to the part where the load is measured, and its length is properly set according to the part laid down though the length of cable-type load sensor 10 is not especially provided.

Figure 3:
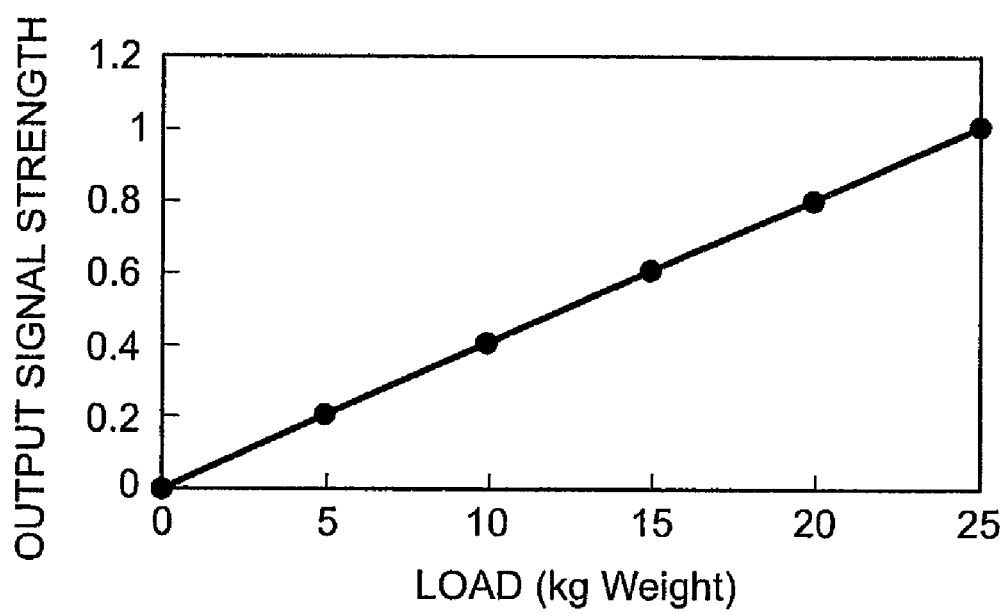
FIG. 3 is a graph illustrating an output characteristic of the cable-type load sensor.

FIG. 3 shows the relationship between load and output signal strength. In FIG. 3, the length of cable-type load sensor 10 was assumed to be 1 m. The load of 0 kg to 25 kg was applied to part (the side of electric resistance measurement part 15 or the side connected electrically with metal wire 14) of 100 mm long of cable-type load sensor 10 of 1 m long.

It was confirmed that the output signal strength of the detector increases proportionally increasing the load, and the load can be measured with an extremely high degree of accuracy.

The invention claimed is:

1. A cable-type load sensor comprising:
   two conductors arranged in parallel; and
   an elastic cladding layer covering circumferences of said two conductors,
   wherein each of said two conductors comprises at least one of a nickel chromium system alloy, an iron nickel system alloy, a copper nickel system alloy, and a nickel titanium system alloy, and
   wherein said cable-type load sensor detects a load as a change in an electrical resistance of said two conductors generated by distortion of said two conductors with the load applied to said cable-type load sensor.

2. The cable-type load sensor according to claim 1, wherein change in an elasticity modulus characteristic of said cladding layer is $1\times10^6$ to $1.5\times10^6$ Pa in a temperature range of $-30°$ C. to $70°$ C.

3. The cable-type load sensor according to claim 1, wherein said cladding layer comprises at least one of silicone rubber and ethylene-propylene rubber.

4. A load measurement system comprising:
   a cable-type load sensor, which comprises two conductors arranged in parallel; and an elastic cladding layer covering circumferences of said two conductors,
   wherein each of said two conductors comprises at least one of a nickel chromium system alloy, an iron nickel system alloy, a copper nickel system alloy, and a nickel titanium system alloy,
   wherein said cable-type load sensor detects a load as a change in an electrical resistance of said two conductors generated by distortion of said two conductors with the load applied to said cable-type load sensor,
   wherein one end of the two conductors arranged in parallel are connected electrically by using a metal wire or by turning one conductor, and
   wherein an electric resistance measurement part is connected through lead lines to the other ends of said two conductors.

* * * * *